C. B. CLRAK.
Mop.
No. 163,460. Patented May 18, 1875.
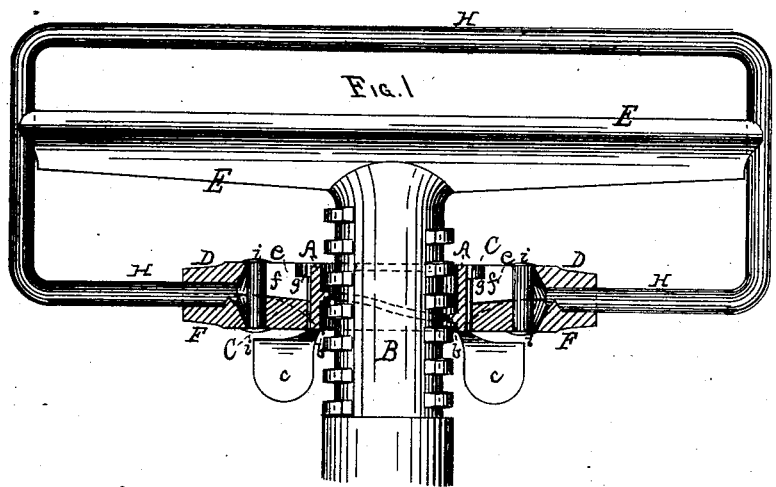
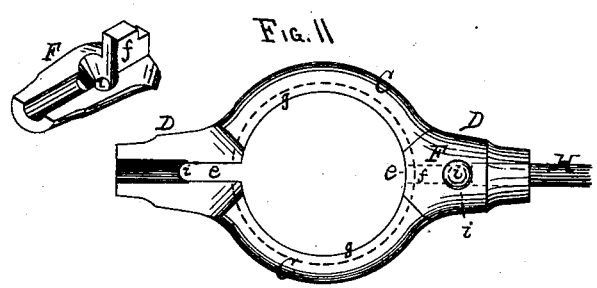
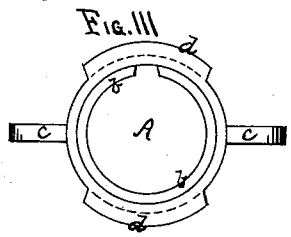
WITNESSES
John K. Clark
C. N. Woodward
INVENTOR.
Charles B. Clark.
THE GRAPHIC CO. PHOTO-LITH. 39 & 41 PARK PLACE, N.Y.

UNITED STATES PATENT OFFICE.

CHARLES B. CLARK, OF BUFFALO, NEW YORK.

IMPROVEMENT IN MOPS.

Specification forming part of Letters Patent No. 163,460, dated May 18, 1875; application filed March 15, 1875.

*To all whom it may concern:*

Be it known that I, CHARLES BASS CLARK, of Buffalo, in the county of Erie and State of New York, have invented certain new and useful Improvements in Mop-Heads, of which the following is a specification:

My improvement relates to that class of mop-heads in which the binding-wire attached to the collar is operated by means of a thumb-screw working within the collar, and traversing the screw-shank of the fixed jaw of the mop-head; and it consists, mainly, in a new construction of the collar, having for its object an increase of strength, combined with lightness, facility of manufacture, and cheapness of production.

The nature of my improvement is shown in the accompanying drawings, in which—

Figure 1 is a sectional side elevation. Fig. 2 is a plan view of the collar and clamping-arms. Fig. 3 is a plan of the thumb-nut.

A is the thumb-nut with interior screw-thread $b$, which engages the lugs on the shank B of the fixed jaw E. On the exterior and upper side of the nut A are placed flanges $d$ $d$, which extend nearly around, space enough being left opposite the thumb-ears $c$ $c$ so that the nut can be molded without a core. C represents the collar with a cylindrical aperture of sufficient diameter and depth to inclose the nut A, and allow it to have a free rotary movement therein. D D are semicircular arms projecting from opposite sides of the collar C, and are grooved to receive the ends of the binding-wire H, as seen in Figs. 1 and 2. Through the inner ends of the arms D D, and extending to the aperture of the collar C, are formed slots $e$ $e$, of sufficient size to allow the thumb-ears $c$ of the nut A to pass through when the same is being inserted within the collar. The nut is prevented from passing through the collar by flanges $d$ $d$, which bear against the shoulders formed in the lower part of the collar, as seen at $g$ in Fig. 1, and in dotted lines in Fig. 2. The clamping-arms F F in Figs. 1 and 2 are also grooved, and provided with rivet-holes $i$ $i$. Their inner ends are also provided with tongues $f$ $f$, that fit into the slots $e$ $e$, leaving room for, and forming one side of, the rivet-holes, as seen in Figs. 1 and 2. The form of these clamping-arms is such that when riveted in place the binding-wire is secured, the nut prevented from returning through the collar, and the full outline of the structure is completed.

The part of a mop most liable to break or give out is the collar; especially is this true in regard to collars that are riveted together. The strain, in tightening the mop for use, frequently breaks or separates the riveted parts; but the collar more often breaks in shipping, as the mops must necessarily be packed in large case, where the incumbent weight and jolt is always borne by the collar portion. To guard against this loss is the main object of my improved mop-head, which, being constructed with the peculiar-shaped collar, as described, will resist a heavy concussion without breaking, and the strain, in tightening, cannot draw or break the rivets, as the flanges on the nut bear against the shoulder formed in the upper part of the collar, thus relieving all strain upon the clamping-arms F F. My improved mop-head has also the advantage of being molded and cast in the simplest manner, and of being manufactured without drilling or filing, and forms a neat, compact, and superior article.

Having thus described my invention, what I claim as new, and desire to secure by Letters Patent, is—

The collar C, with slots $e$ $e$, and clamping-arms F F, provided with tongues $f$ $f$, in combination with the nut A, substantially as constructed and arranged.

In testimony whereof I have hereunto signed my name in the presence of two subscribing witnesses.

CHARLES B. CLARK.

Witnesses:
 HENRY R. CLARK,
 JOHN K. CLARK.